US008842583B2

United States Patent
Bartlett et al.

(10) Patent No.: US 8,842,583 B2
(45) Date of Patent: Sep. 23, 2014

(54) SYSTEM AND METHOD FOR MAINTAINING DATA CONNECTIVITY OVER A SATELLITE LINK

(75) Inventors: Nigel Bartlett, San Diego, CA (US); Louis Gagne, San Diego, CA (US); Thomas Volkman, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 247 days.

(21) Appl. No.: 13/222,834

(22) Filed: Aug. 31, 2011

(65) Prior Publication Data

US 2013/0051249 A1    Feb. 28, 2013

(51) Int. Cl.
*H04J 1/16*    (2006.01)
*H04L 12/26*   (2006.01)
*H04B 7/185*   (2006.01)
*H04L 12/28*   (2006.01)

(52) U.S. Cl.
CPC ............ *H04B 7/18589* (2013.01); *H04L 43/10* (2013.01); *H04L 43/0811* (2013.01); *H04L 43/0823* (2013.01)
USPC ............................. 370/278; 370/282; 370/316

(58) Field of Classification Search
CPC . H04L 43/0811; H04L 43/0823; H04L 43/10; H04B 7/18589
USPC .......................................... 370/278, 282, 316
See application file for complete search history.

(56) References Cited

U.S. PATENT DOCUMENTS

| | | | |
|---|---|---|---|
| 6,651,190 B1 * | 11/2003 | Worley et al. .................... 714/43 |
| 7,020,701 B1 * | 3/2006 | Gelvin et al. .................. 709/224 |
| 7,120,837 B1 * | 10/2006 | Ferris ............................... 714/56 |
| 2002/0046348 A1 * | 4/2002 | Brustoloni ...................... 713/201 |
| 2005/0021770 A1 * | 1/2005 | Helm et al. .................... 709/228 |
| 2006/0212750 A1 * | 9/2006 | Denninghoff et al. ............ 714/6 |
| 2009/0013210 A1 * | 1/2009 | McIntosh et al. ................. 714/4 |
| 2011/0197246 A1 * | 8/2011 | Stancato et al. .............. 725/111 |
| 2011/0200034 A1 * | 8/2011 | Delveaux et al. ............. 370/352 |

* cited by examiner

*Primary Examiner* — John Pezzlo
(74) *Attorney, Agent, or Firm* — K&L Gates LLP

(57) ABSTRACT

A system for maintaining data connectivity in a satellite communications system including a satellite terminal with a ping mechanism, a satellite ground station, and a ping server, where the ping mechanism pings the ping server and restores data connectivity between the satellite terminal and the satellite ground station.

17 Claims, 8 Drawing Sheets

SYSTEM AND METHOD FOR MAINTAINING DATA CONNECTIVITY OVER A SATELLITE LINK

BACKGROUND

In a satellite-based communications system, it may be difficult to determine if a satellite link is fully functional end-to-end without sending data across the satellite link. Algorithms exist to monitor and handle the various conditions that may impair the ability to send data over a satellite link, but these algorithms may be complex and hard to develop and test. The algorithms may also rely on the user equipment that is attached to a satellite terminal to function, which may make them unreliable.

BRIEF SUMMARY

An example system for maintaining data connectivity in a satellite communications system includes a satellite terminal including a ping mechanism, a satellite ground station, and a ping server, where the ping mechanism pings the ping server and restores data connectivity between the satellite terminal and the satellite ground station.

BRIEF SUMMARY OF THE DRAWINGS

FIG. 7 depicts an exemplary procedure for determining if a connection is always on.

Additional features and advantages are described herein, and will be apparent from the following Detailed Description and the figures.

DETAILED DESCRIPTION

Figure 1:
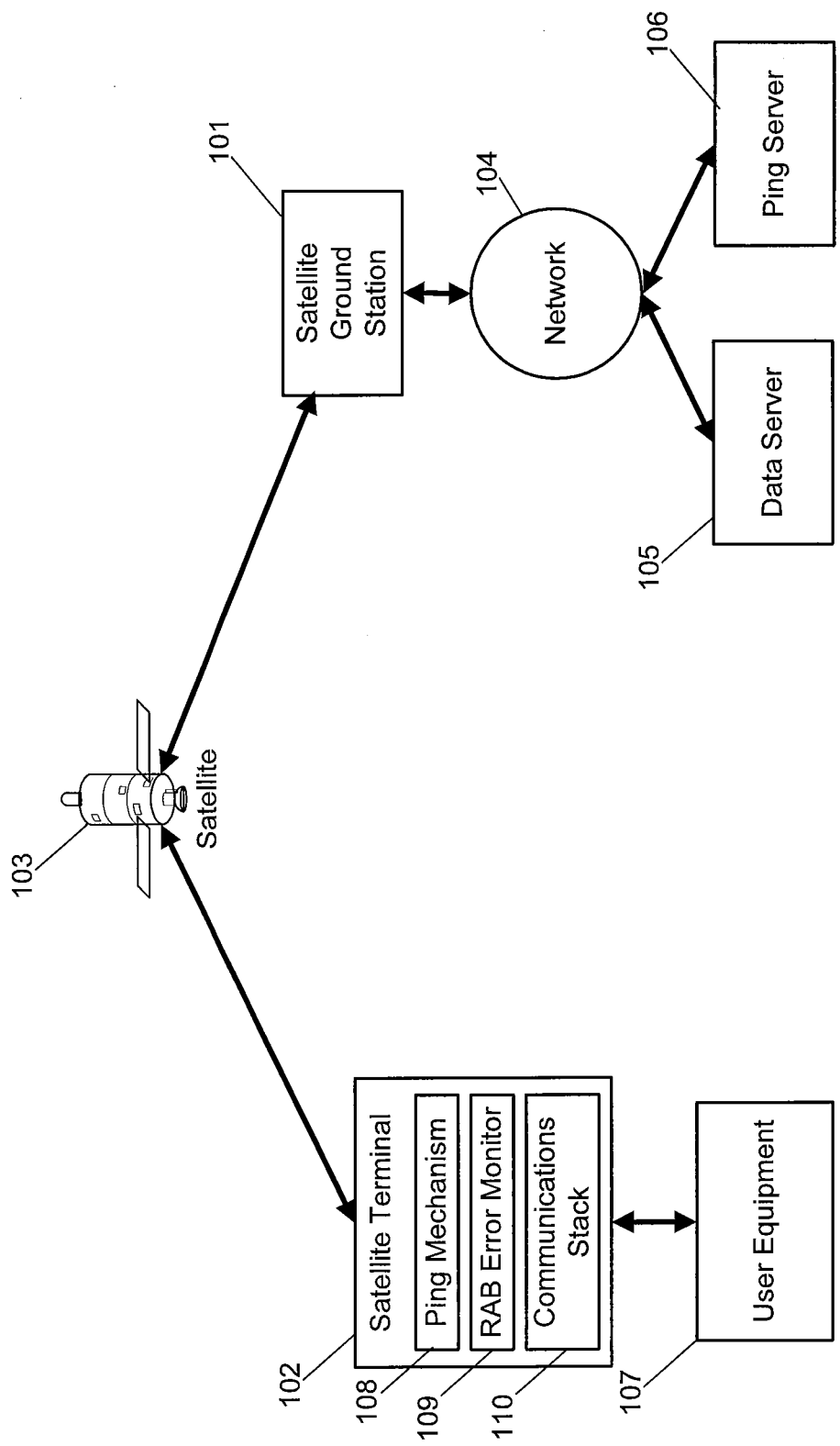
FIG. 1 depicts an exemplary system for maintaining data connectivity over a satellite link.

FIG. 1 depicts an exemplary system for maintaining data connectivity over a satellite link. The system may include a satellite ground station (or hub) 101, a satellite terminal 102, a satellite 103, a network 104, a data server 105, a ping server 106, and user equipment 107.

The satellite ground station 101 may be a hub or gateway for a satellite communications system, and may be connected to the satellite terminal 102 through the satellite 103. The satellite ground station 101 may be, for example, a high capacity, large antenna earth station with connectivity to ground telecommunications infrastructure. Feeder links may carry data between the satellite ground station 101 and the satellite 103, and may include a forward uplink for transmitting data from the satellite ground station 101 to the satellite 103, and a return downlink for transmitting data from the satellite 103 to the satellite ground station 101. User broadband links may carry data between the satellite 103 and the satellite terminal 102, and may include a return uplink for transmitting data from the satellite terminal 102 to the satellite 103, and a forward downlink for transmitting data from the satellite 103 to the satellite terminal 102. The user broadband links may enable the provision of broadband service to the satellite terminal 102.

The satellite terminal 102 may be, for example, a Very Small Aperture Terminal (VSAT), which may be used by end users to access the satellite communications system. The satellite terminal 102 may include a remote satellite dish for receiving RF signals from, and transmitting RF signals to, the satellite 103, a satellite modem and other equipment for managing the sending and/or receiving of data, and may be connected to the user equipment 107, which may be computer systems or other electronic devices capable of network communications at a site remote from the satellite ground station 101. For example, the satellite terminal 102 may be used at a residence or place of business to provide access to the network 104, which may be for, example, the Internet. The satellite terminal 102 may also be used at an unmanned remote location, and may be used to provide machine to machine or SCADA communication to the user equipment 107. A communications stack 110 may be part of the satellite terminal. The communications stack 110 may be the set of, for example, drivers, libraries, processes, and protocols on the satellite terminal 102 responsible for establishing and using the data connection between the satellite terminal 102 and the satellite ground station 103.

The satellite 103 may be any suitable communications satellite for connecting the satellite ground station 101 to the user equipment 107. The satellite 103 may use spot beams, frequency reuse, and/or polarization reuse to maximize the total capacity of the system. Signals passing through the satellite 103 in the forward direction, towards the satellite terminal 102, may be based on the DVB S.2 standard (ETSI EN 302 307) using signal constellations up to and including at least 16-APSK. The signals intended to pass through the satellite 103 in the return direction, toward the satellite ground station 101, may be based on the IPoS standard (ETSI TS 102 354). Other suitable signal types may also be used in either direction, including, for example higher data rate variations of DVB S.2, or satellite systems based on the Inmarsat Air Interface or GeoMobile Radio Services standards.

The satellite ground station 101 may be connected the network 104, which may be, for example, a private network and/or the Internet. The user equipment 107 connected to the satellite terminal 102 may connect to the network 104 through the satellite 103 and the satellite ground station 101. Data sent from the satellite terminal 102 to the network 104 may be transmitted to the satellite 103 on the return uplink, then from the satellite 103 to the satellite ground station 101 using the return downlink. The satellite ground station 101 may then transmit the data to the network 104. Data from the network 104 may be sent the satellite terminal 102 by being transmitted to the satellite ground station 101, then to the satellite 103 on the forward uplink, and then to the satellite terminal 102 using the forward downlink.

The data server 105 may be any suitable data server or servers. For example, the data sever 105 may be a data farm or a single specialized server. The data server 105 may be connected to the satellite ground station 101 through the network 104, which may be the Internet, and/or may be a private network or a virtual private network (VPN).

The ping server 106 may be any suitable combination of hardware and software for responding to active pings from the satellite terminal 102. The ping server 106 may be the same piece of equipment as the data server 105, co-located with the data server 105, or remote from the data server 105. The ping server 106 and data server 105 may also be part of the satellite ground station 101. Pinging the ping server 106 may allow the satellite terminal 102 to test data connectivity between the satellite terminal 102 and the data server 105 and to detect problems that might exist with the data connectivity. There may be more than one ping server 106 associated with the data server 105, and every ping server 106 may have a separate Internet Protocol (IP) address.

The satellite terminal 102 may include a built in ping mechanism 108. The ping mechanism 108 may be any suitable combination of hardware and software for performing pings to test for data connectivity between the satellite terminal 102 and the data server 105, and for performing various recovery steps if data connectivity has been lost. The ping mechanism 108 may ping IP addresses associated with the ping server 106 to test data connectivity between the satellite terminal 102 and the data server 105. If data connectivity has been lost, the ping mechanism 108 of the satellite terminal 102 may be capable of restarting the connection or rebooting the satellite terminal 102, to attempt to restore data connectivity.

Figure 2:
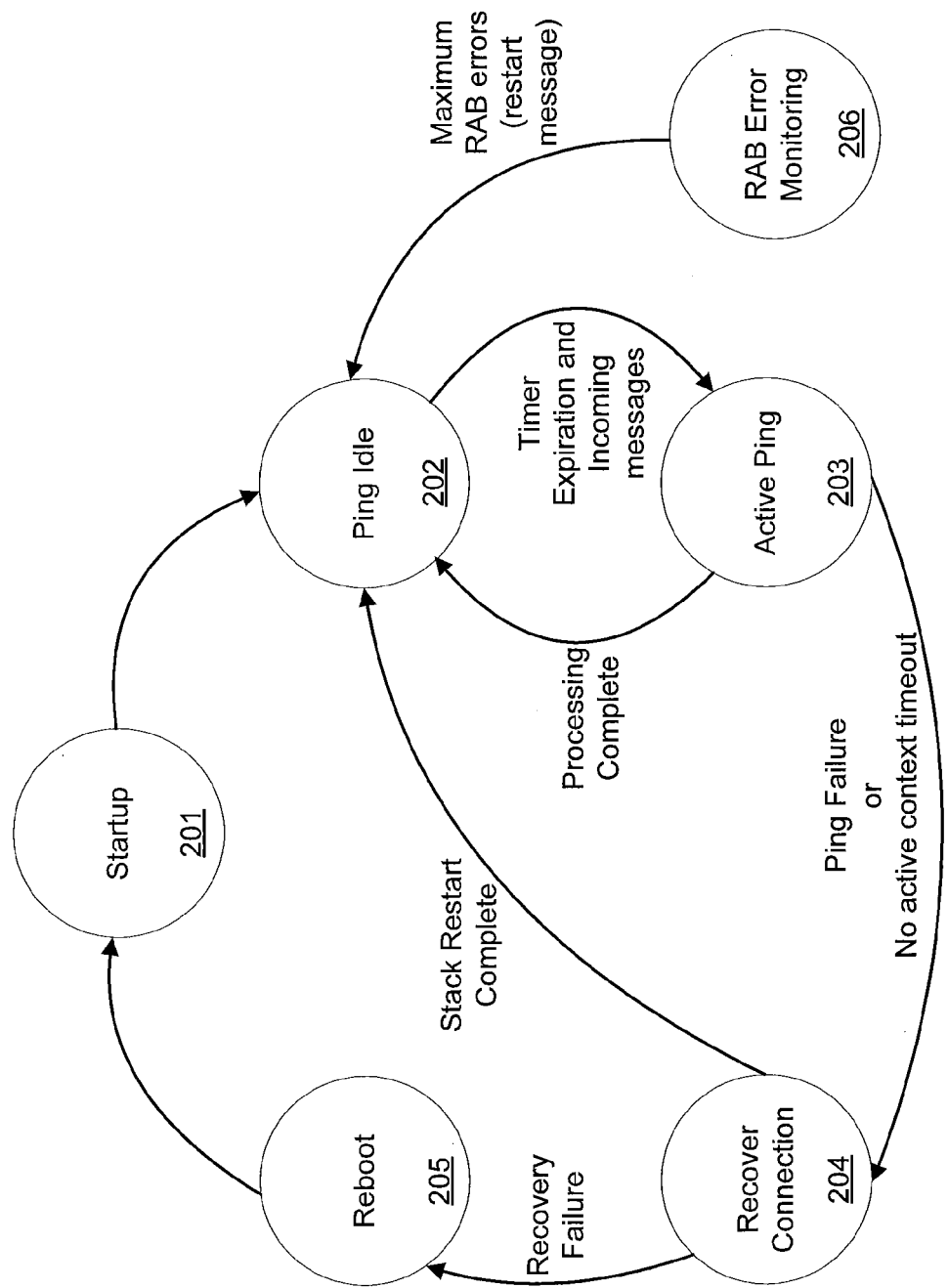
FIG. 2 depicts an exemplary state diagram for a system for maintaining data connectivity over a satellite link.

FIG. 2 depicts an exemplary state diagram for a system for maintaining data connectivity over a satellite link. The ping mechanism 108 in the satellite terminal 102 may transition between various states of operation depending on the current state of data connectivity and the success or failure of various recovery mechanisms.

In a startup state 201, the satellite terminal 102 may be started, and may establish data connectivity with the satellite ground station 101 and the data server 105 through the satellite 103. The ping mechanism 108's RAB error monitoring state 206 may also be entered concurrent with the startup state 201, and may run concurrently with the other states of the ping mechanism 108. An RAB error monitor 109 may be a watchdog process running in the RAB error monitoring state 206 that monitors whether the user equipment 107 requested data transfers from the satellite terminal 102 succeed. If the RAB error monitor 109 detects a number of errors in the data transfers, for example, six consecutive errors, the RAB error monitor 109 may send a "Restart" message to the other processes of the ping mechanism 108.

After the satellite terminal 102 has started up, the ping mechanism 108 of the satellite terminal 102 may transition from the startup state 201 to a ping idle state 202. In the ping idle state 202, the ping mechanism 108 of the satellite terminal 102 may not be actively pinging the ping server 106. A countdown timer may count down the time since the ping mechanism 108 entered the ping idle state 202 from the startup state 201, from an active ping state 203, from a recover connection state 204, and/or from a RAB error monitoring state 206. The ping mechanism 108 may be waiting for the occurrence of an event, such as, for example, the expiration of the countdown timer, the passage of a set amount of time without the receipt of any incoming data from the satellite ground station 101, and/or a "Restart" message from the RAB error monitoring process, to enter the active ping state 203.

When the ping mechanism 108 transitions from the ping idle state 202 to the active ping state 203, the ping mechanism 108 may start actively pinging the ping server 106 to test the data connectivity. The ping mechanism 108 may cause the satellite terminal 102 to send out ping messages, such as, for example, Internet Control Message Protocol (ICMP) pings, to the IP addresses for any number of ping servers 106. If the pinging is successful, for example, the ping servers 106 return an acceptable number of the ping messages back to the satellite terminal 102, indicating that data connectivity still exists between the satellite terminal 102 and the data server 105 through the satellite 103, the ping mechanism 108 may re-enter the ping idle state 202. If the pinging is unsuccessful, for example, too few or none of the ping servers 106 return the ping messages to the satellite terminal 102, or the ping mechanism 108 cannot find an active satellite connection, or PDP context, to send the ping messages out over, the ping mechanism 108 may enter a recover connection state 204.

In the recover connection state 204, the ping mechanism 108 may attempt to restore data connectivity between the satellite terminal 102 and the data server 105 through the satellite 103 and the satellite ground station 101. The ping mechanism 108 may, for example, attempt to restart the communications stack 110 of the satellite terminal 102, which may force the satellite terminal 102 to restart the satellite link activation sequence with the satellite ground station 101, re-establishing a connection with the satellite ground station 101 through the satellite 103. If the stack restart completes successfully, the ping mechanism 108 may re-enter the ping idle state 202. If the attempt to recover the connection fails and reestablish data connectivity fails, for example, if the stack restart does not complete, the ping mechanism 108 may enter a reboot state 205.

In the reboot state 205, the ping mechanism 108 may force the satellite terminal 102 to reboot itself. Once the satellite terminal 102 has rebooted, the satellite terminal 102 may enter the startup state 201 and attempt to establish data connectivity with the data server 105.

Figure 3:
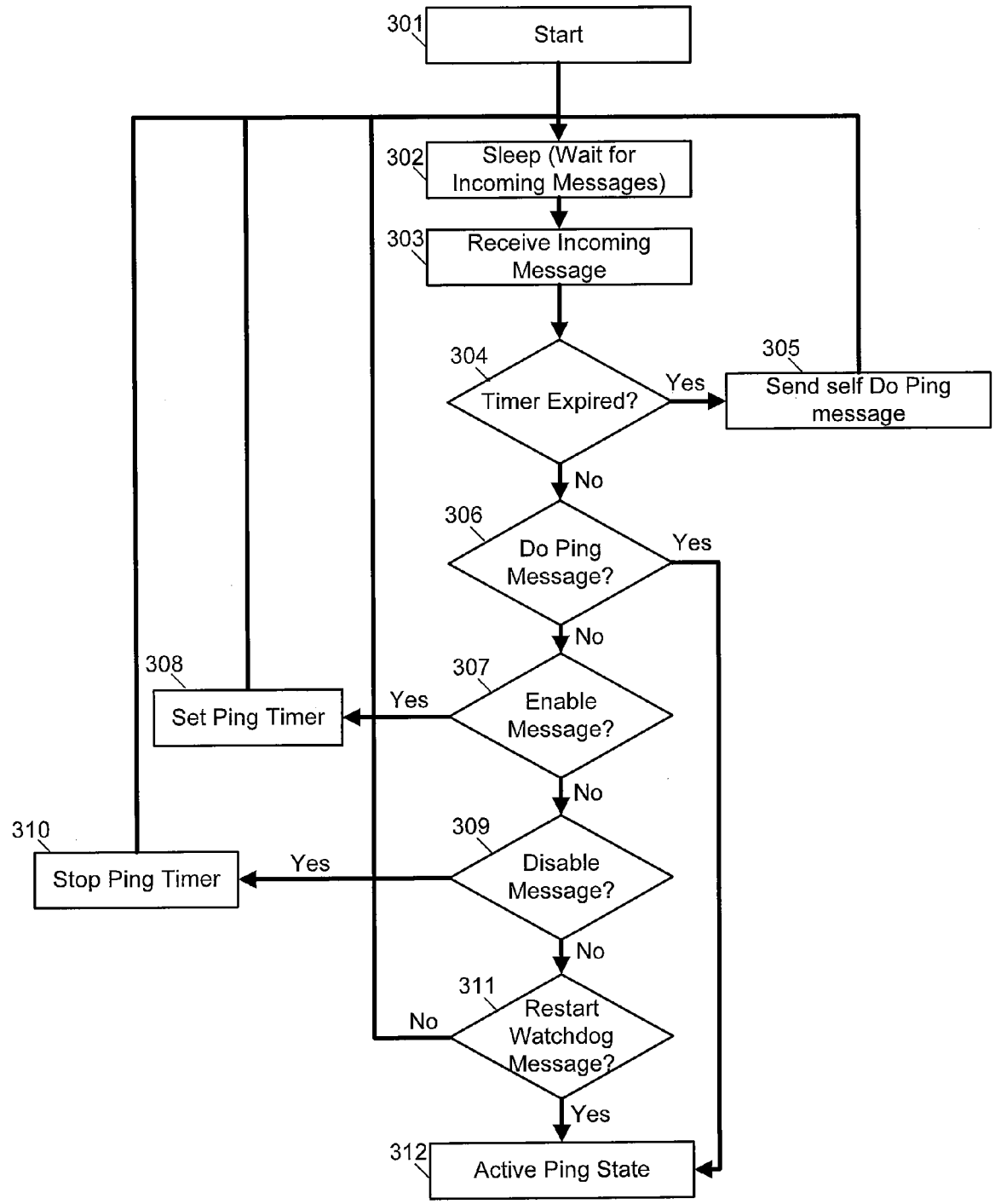
FIG. 3 depicts an exemplary procedure for entering an active ping state.

FIG. 3 depicts an exemplary procedure for entering an active ping state. The active ping state 203 may be entered from the ping idle state 202 under certain conditions. In block 301, the ping mechanism 108 may be started. For example, when the satellite terminal 102 starts, the ping mechanism 108 may enter the startup state 201. After startup has completed, the ping mechanism 108 may transition to the ping idle state 202.

In block 302, the ping mechanism 108 may sleep, or idle, and wait to receive incoming messages. For example, in the ping idle state 202, the ping mechanism 108 may be idle, waiting to receive messages the may indicate the need to enter the active ping state 203.

In block 303, the ping mechanism 108 may receive incoming messages. Messages may be sent to the ping mechanism 108 by, for example, the ping mechanism 108 itself, or by the RAB error monitor 109 portion of the ping message.

In block 304, the ping mechanism 108 may check to see if the ping mechanism 108's timer has expired. The timer may be started, for example, in block 311, after the ping mechanism 108 initially enters the ping idle state 202, and may count down from the time since the ping mechanism 108 entered the ping idle state 202. If the satellite terminal 102 receives incoming data from the satellite ground station 101, the timer may be restarted. The expiration of the timer may indicate that the appropriate amount of time has passed since the last time the ping mechanism 108 entered the active ping state 203 and pinged the ping server 106. The appropriate amount of time may be configurable, for example, by a user, and may be used to set the amount of time between pings of the ping server 106. For example, if the timer is set to 30 minutes, the ping mechanism 108 may enter the active ping state 203 once every 30 minutes. If the timer has expired, flow proceeds to block 305. Otherwise, flow proceeds to block 306.

In block 305, the ping mechanism 108 may send itself a "Do Ping" message. The ping mechanism 108 may send itself a "Do Ping" message to indicate that the ping mechanism 108 should transition to the active ping state 203 due to the timer's expiration. Flow may proceed from block 305 back to block 302 and then block 303, where the "Do Ping" message may be received. The timer may also be reset.

In block 306, the ping mechanism 108 may determine if a "Do Ping" message has been received? If the ping mechanism 108 has received a "Do Ping" message, such as, for example, one generated in block 305, flow may proceed to block 312. Otherwise, flow proceeds to block 307.

In block 307, the ping mechanism 108 may determine if an "Enable" message has been received. If the ping mechanism 108 has received an "Enable" message, for example, one sent during the startup state 201, flow proceeds to block 308. Otherwise, flow proceeds to block 309.

In block 308, the ping mechanism 108 may set the timer to the appropriate amount of time. The timer may be set by the ping mechanism 108 to start counting down from the configured time between pings. Flow may then proceed back to block 302.

In block 309, the ping mechanism 108 may determine if a "Disable" message has been received. If the ping mechanism 108 has received a "Disable" message, flow may proceed to block 310. Otherwise, flow proceeds to block 311.

In block 310, the ping mechanism 108 may stop the ping timer. The timer's countdown may be stopped by the ping mechanism 108, preventing the timer from expiring. This may prevent the ping mechanism 108 from entering the active ping state 203.

In block 311, the ping mechanism 108 may determine if a "Restart" message has been received. If the ping mechanism 108 has received a "Restart" message, for example, from a watchdog such as the RAB error monitor 109, flow proceeds to block 312. Otherwise, flow proceeds back to block 302.

In block 312, the ping mechanism 108 may enter the active ping state 203. For example, if either the timer has expired, or the ping mechanism 108 has received a "Restart" message, the ping mechanism 108 may enter the active ping state 203 to ping the ping server 106 and restart the communications stack 110 or reboot the satellite terminal 102, if necessary.

Figure 4:
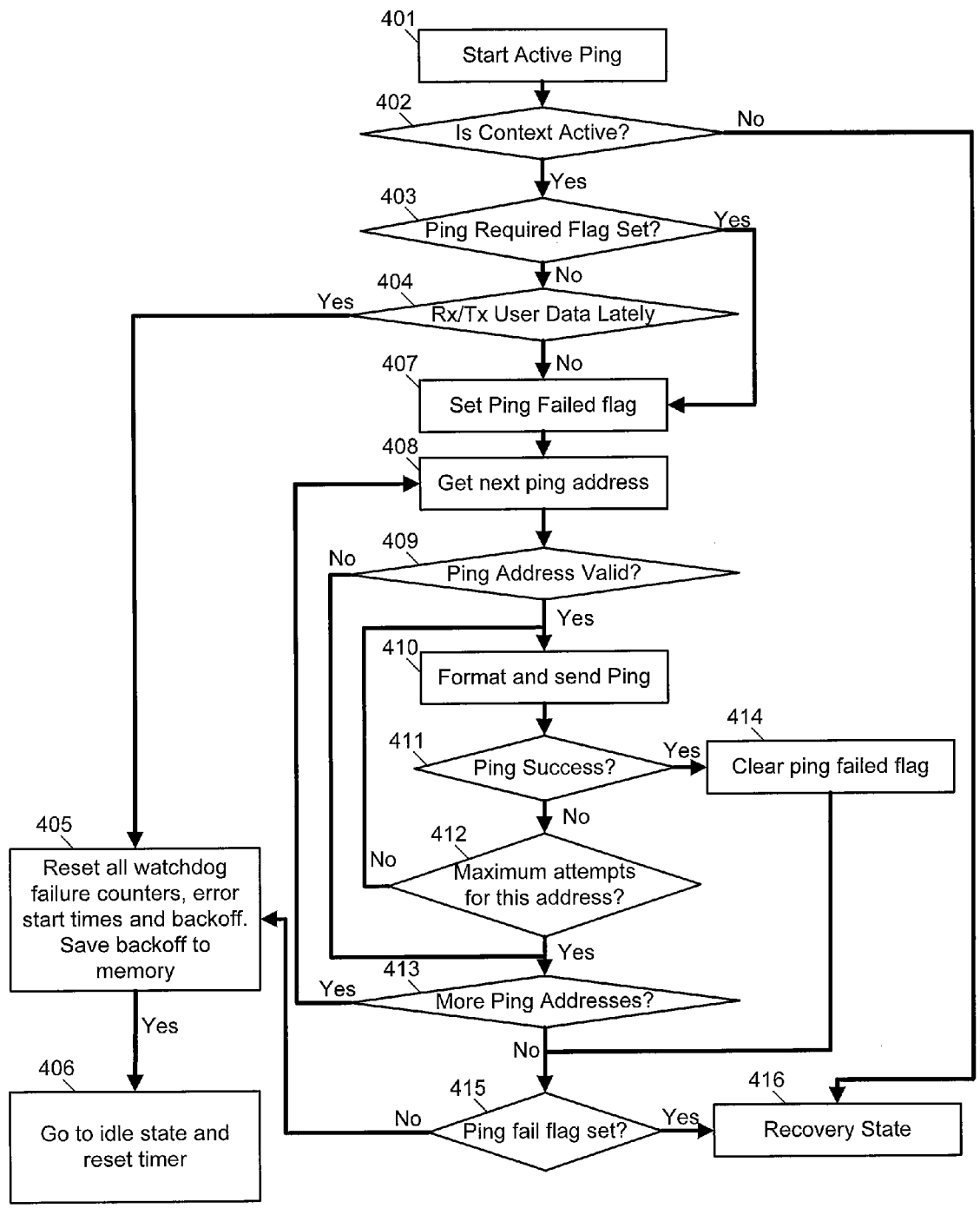
FIG. 4 depicts an exemplary procedure for active pinging.

FIG. 4 depicts an exemplary procedure for active pinging. When the ping mechanism 108 of the satellite terminal 102 enters the active ping state 203, the ping mechanism 108 may begin pinging the ping server 106, to test data connectivity between the satellite terminal 102 and the data server 105. In block 401, the ping mechanism 108 may start the procedure for active pinging. The ping mechanism 108 may have transitioned into the active ping state 203 from the ping idle state 202.

In block 402, the ping mechanism 108 may determine if a Packet Data Protocol (PDP) context is active. A data connection between the satellite terminal 102 and the satellite ground station 101 may be a PDP context. If a PDP context is active, flow proceeds to block 403. Otherwise, if no PDP contexts are active, flow proceeds to block 416, and no pinging may be performed as there may be no connection available for the satellite terminal 102 to use to ping the ping server 106.

In block 403, the ping mechanism 108 may determine if a "Ping Required" flag has been set. The "Ping Required" flag may be set, for example, if pinging is to be performed without checking whether the satellite terminal 102 has recently been successful sending data to or receiving data from the satellite ground station 101. Use of the "Ping Required" flag may reduce the number and frequency of pings performed by the ping mechanism 108, as no ping will be performed unless the "Ping Required" has been set. If the "Ping Required" flag is set, flow proceeds to block 407, otherwise flow proceeds to block 404.

In block 404, the ping mechanism 108 may determine if the satellite terminal 102 has successfully received data from or sent data to the satellite ground station 101 recently. For example, the ping mechanism 108 may check for the successful receipt or transmission of data within a configured amount of time, such as, for example, half of the periodicity. If the satellite terminal 102 has successfully sent or received data within the configured time, flow proceeds to block 405. Otherwise flow proceeds to block 407.

In block 405, the ping mechanism 108 may reset all watchdog counters, error start times, and a backoff parameter. The backoff parameter may be saved in non-volatile memory on the satellite terminal 102. All of the configured parameters for the satellite terminal 102 may be stored in non-volatile memory, such as, for example, flash memory. The backoff parameter may be used to prevent the satellite terminal 102 from flooding the network with signaling when the satellite terminal 102 keeps getting rejected. For example, if the satellite terminal 102 is not correctly configured or has an invalid subscription and gets rejected from connecting with the satellite ground station 101, then incrementing of the backoff parameter on each rejection will cause an increase (e.g., exponential) in the amount of time between attempts by the satellite terminal 102 to try to access the network. For example, the amount of time between attempts may be up to 24 hours which may result in a misconfigured satellite terminal 102 backing off to trying once a day rather than every few minutes. The successful receipt or transmission of data by the satellite terminal 102 within the configured amount of time may indicate that the satellite terminal still has data connectivity, and therefore no pinging may be necessary. The ping mechanism 108 may reset any error counts, such as, for example, the RAB error monitor 108's count of data transmission errors, reset error start times, reset the backoff parameter, as no backoff may be needed, and save information to the CIM preparation for transition back to the ping idle state 202.

In block 406, the ping mechanism 108 may reset the timer and enter the ping idle state 202. Because the data connection is still active, no pinging may be necessary, so the ping mechanism 108 may leave the active ping state 203 and re-enter the ping idle state 202. The ping mechanism 108 may also reset the timer used to countdown to the next time the ping mechanism 108 may enter the active ping state 203.

If the "Ping Required" flag is set and/or the satellite terminal 102 has not recently received data from or sent data to the satellite ground station 101 the "Ping Failed" flag may be set in block 407. The "Ping Failed" flag may indicate that attempts to ping the ping server 106 have failed, and data connectivity has been lost. The "Ping Failed" flag may be set before any pinging occurs and may be cleared if the pinging is successful.

In block 408, the ping mechanism 108 may retrieve the next available address to ping. The ping mechanism 108 may have access to a list of IP addresses, with each IP address corresponding to a ping server 106. If for example, no pinging has been attempted since the ping mechanism 108 most recently entered the active ping state 203, the ping mechanism 108 may retrieve the first IP address on the list of IP addresses. After pinging the first IP address, the ping mechanism 108 may retrieve the second IP address, and so on.

In block 409, the ping mechanism 108 may determine if the IP address retrieved in block 408 is valid. The ping mechanism 108 may check the IP address to ensure that IP address conforms to known standards for IP addresses, such as, for example, IPv4 and IPv6, and that the IP address is an address external to the satellite terminal 102. For example, the satellite terminal 102 may use the standard localhost IP address of 127.0.0.1 to refer to itself. Thus, 127.0.0.1 may not be a valid IP address for pinging.

In block 410, the ping mechanism 108 may format and send the ping message. The ping mechanism 108 may attempt to ping the ping server 106 using the IP address. For example, the ping mechanism 108 may send an ICMP ping to the ping server 106 at the IP address. The ping message may be sent out by the satellite terminal 102.

In block 411, the ping mechanism 108 may determine if the pinging was successful. If the ping server 106 returned the ping message from the satellite terminal 102, the pinging may be considered successful, and the flow may proceed to block 414. Otherwise, if the ping message is not returned, flow may proceed to block 412.

In block 412, the ping mechanism 108 may determine if the maximum number of ping attempts have been made to the IP address. The ping mechanism 108 may be configured to only ping each IP address a certain number of times if the successive ping attempts are not successful, before determining that the IP address cannot be reached. If the ping mechanism 108 has pinged the IP address the maximum number of times, flow proceeds to block 413. Otherwise, flow proceeds back to black 410, where the ping mechanism 108 may send out another ping message to the IP address.

In block 413, the ping mechanism 108 may determine if there are any more IP addresses that can be pinged. There may be multiple ping servers 106, and each ping server may have its own IP address on the list of IP addresses. If there are IP addresses on the list of IP addresses that have not been pinged since the ping mechanism 108 most recently entered the active ping state 202, flow may proceed back to block 408 where the ping mechanism 108 may retrieve the next IP address. Otherwise, flow proceeds to block 415.

In block 414, the ping mechanism 108 may clear the "Ping Failed" flag. If the pinging of the ping server 106 is successful, the ping attempt may no longer be considered failed. The ping mechanism 108 may clear the "Ping Failed" to indicate that the pinging was successful. Flow then proceeds to block 415.

In block 415, the ping mechanism 108 may determine if the "Ping Failed" flag is set. If the ping attempt was successful, the "Ping Failed" flag may be cleared, for example, as in block 414, and flow proceeds to block 405. If the ping attempt was unsuccessful, for example, none of the ping servers 106 at the pinged IP addresses returned the ping, flow proceeds to block 416.

In block 416, the ping mechanism 108 may enter the recover connection state 204. The ping attempt may have failed, and data connectivity between the satellite terminal 102 and the satellite ground station 101 may need to be recovered. The ping mechanism 108 may enter the recover connection state 204 from the active ping state 203 to attempt to recover data connectivity.

Figure 5:
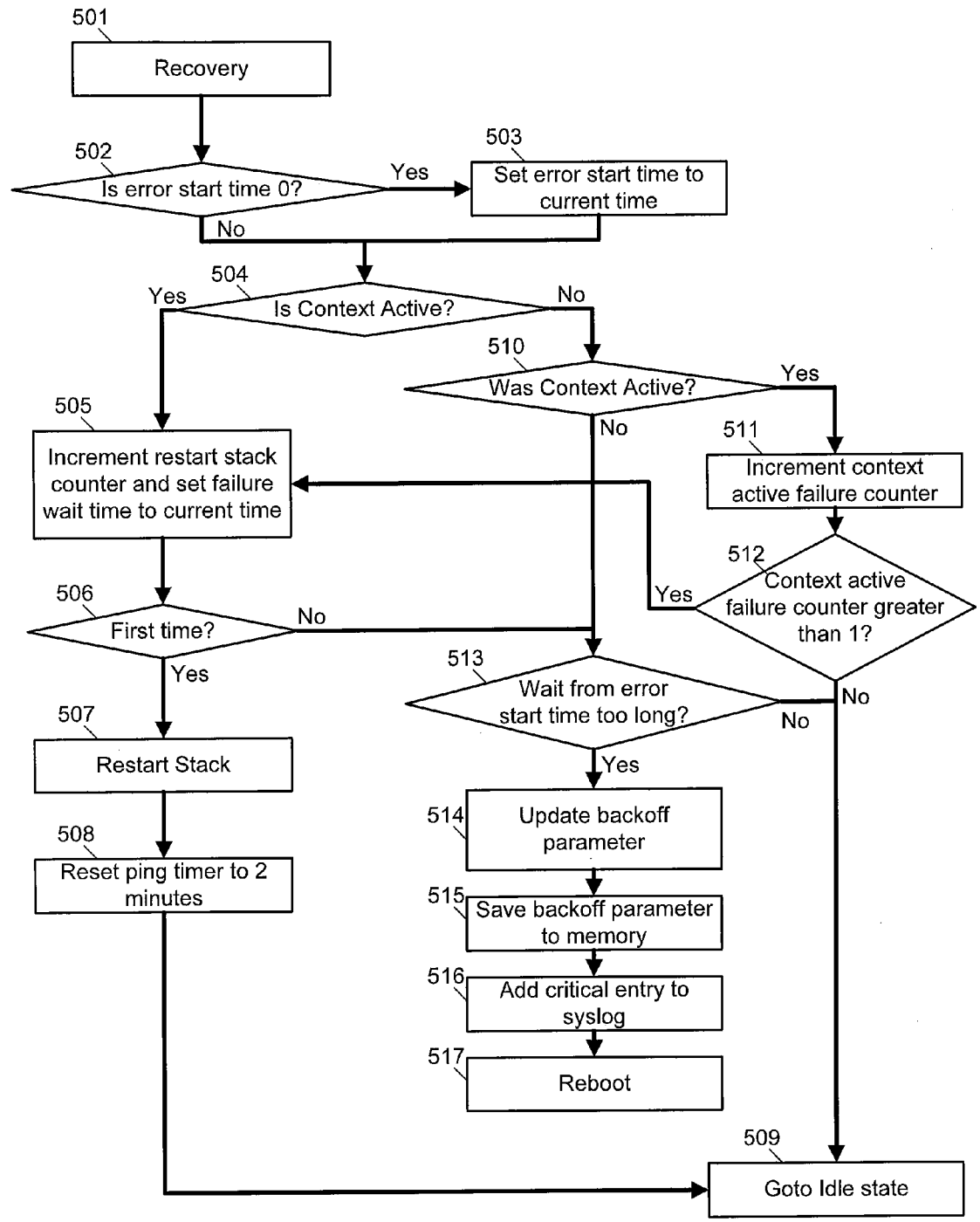
FIG. 5 depicts an exemplary procedure for recovering a connection.

FIG. 5 depicts an exemplary procedure for recovering a connection. In block 501, the ping mechanism 108 may enter the recover connections state 204 and begin recovery of data connectivity.

In block 502, the ping mechanism 108 may determine if an error start time is set to zero. The error start time may indicate the time at which the ping mechanism 108 entered the recover connection state 204 due to a failed ping attempt. If the error start time is set to zero, flow proceeds to block 503. Otherwise, flow proceeds to block 504.

In block 503, the ping mechanism 108 may set the error start time to the current start time. Setting the error start time to the current start time may store the time at which the ping mechanism 108 entered the recover connection state 204. Flow then proceeds to block 504.

In block 504, the ping mechanism 108 may determine if a PDP context is active. If a PDP context is active, flow proceeds to block 505. Otherwise, if no PDP contexts are active, flow proceeds to block 510.

In block 505, the ping mechanism 108 may increment a restart stack counter, and set a failure wait time to the current time. The restart stack counter may count the number of times the ping mechanism 108 has attempted to restart the communication stack of the satellite terminal 102.

In block 506, the ping mechanism 108 may determine if this is the first time the ping mechanism 108 has attempted to restart the communications stack 110 of the satellite terminal 102. If it is the first time, for example, if the restart stack counter is set to one, flow proceeds to block 507. Otherwise, flow proceeds to block 513.

In block 507, the ping mechanism 108 may restart the communications stack 110. Restarting the communication stack of the satellite terminal 102 may force the satellite terminal 102 to re-establish a connection with the satellite ground station 101 through the satellite 103.

In block 508, the ping mechanism 108 may reset the ping timer (e.g. to 2 minutes). The ping timer may be set to 2 minutes to allow enough time for the communications stack 110 to be restarted before the ping mechanism 108 attempts to ping the ping server 106 again.

In block 509, the ping mechanism 108 may enter the ping idle state 202.

In block 510, the ping mechanism 108 may determine if the PDP context that was not active in block 504 was previously active. If the PDP context was not previously active, flow proceeds to block 513. Otherwise, flow proceeds to block 511.

In block 511, the ping mechanism 108 may increment a context active failure counter. The context active failure counter may count the number of times the previously active PDP context failed to be active when checked by the ping mechanism 108 in the recover connection state 204.

In block 512, the ping mechanism 108 may determine if the context active failure counter is greater than one. If the context active failure counter is greater than one, for example, the previously active PDP context has failed before, flow proceeds to block 505. Otherwise, flow proceeds to block 509 where the ping mechanism 108 may enter the ping idle state 202, allowing time for the satellite terminal 102 to automatically attempt to reactive the PDP context, as discussed below in FIG. 8.

In block 513, the ping mechanism 108 may determine if too long an amount of time has passed from the error start time. The error start time may be the time at which the ping mechanism 108 entered the recover connection state 204. If either the PDP context is not active and was not previously active, or if the restart stack counter is greater than one, the ping mechanism 108 may then determine how much time has passed since the ping mechanism 108 entered the recover connection state 204. The error start time may be compared to the current time, and if the gap between the two is long enough, flow proceeds to block 514. Otherwise, if not enough time has passed from the error start time to the current time, flow proceeds to block 509 where the ping mechanism 108 may enter the ping idle state 202.

In block 514, the ping mechanism 108 may update the backoff parameter. The backoff parameter may be updated by, for example, incrementing the backoff parameter. This may cause the satellite terminal 102 to wait longer before attempting to connect to the satellite ground station 101 the next time data connectivity is lost, preventing repeated failures to restore data connectivity, due to, for example, the satellite terminal 102 being misconfigured, from causing the satellite terminal 102 to flood the network.

In block 515, the ping mechanism 108 may save the backoff parameter. The backoff parameter may be stored in flash memory, or any other suitable non-volatile memory, on the satellite terminal 102, along with other parameters for the satellite terminal 102, so that rebooting the satellite terminal 102 does not reset certain parameters. Parameters stored in volatile memory may be reset when the satellite terminal 102 is rebooted.

In block 516, the ping mechanism 108 may add a critical entry in the syslog. The syslog may be a log of events that occur within the satellite terminal 102, and particularly events relating to the overall status of the satellite terminal 102. The critical entry added to the syslog may indicate that the ping attempt failed and efforts to restart the communication stack were unsuccessful. The ping mechanism 108 may wait for a set period, for example, 5 clock tics, before writing the critical entry to the syslog.

In block 517, the ping mechanism 108 may enter the reboot state 205. If other attempts at recovering data connectivity between the satellite terminal 102 and the satellite ground station 101 have failed, the satellite terminal 102 may be rebooted. Rebooting the satellite terminal 102 may cause the satellite terminal 102 to shut down entirely, then turn back on and enter the startup state 201, where data connectivity may be re-established.

Figure 6:
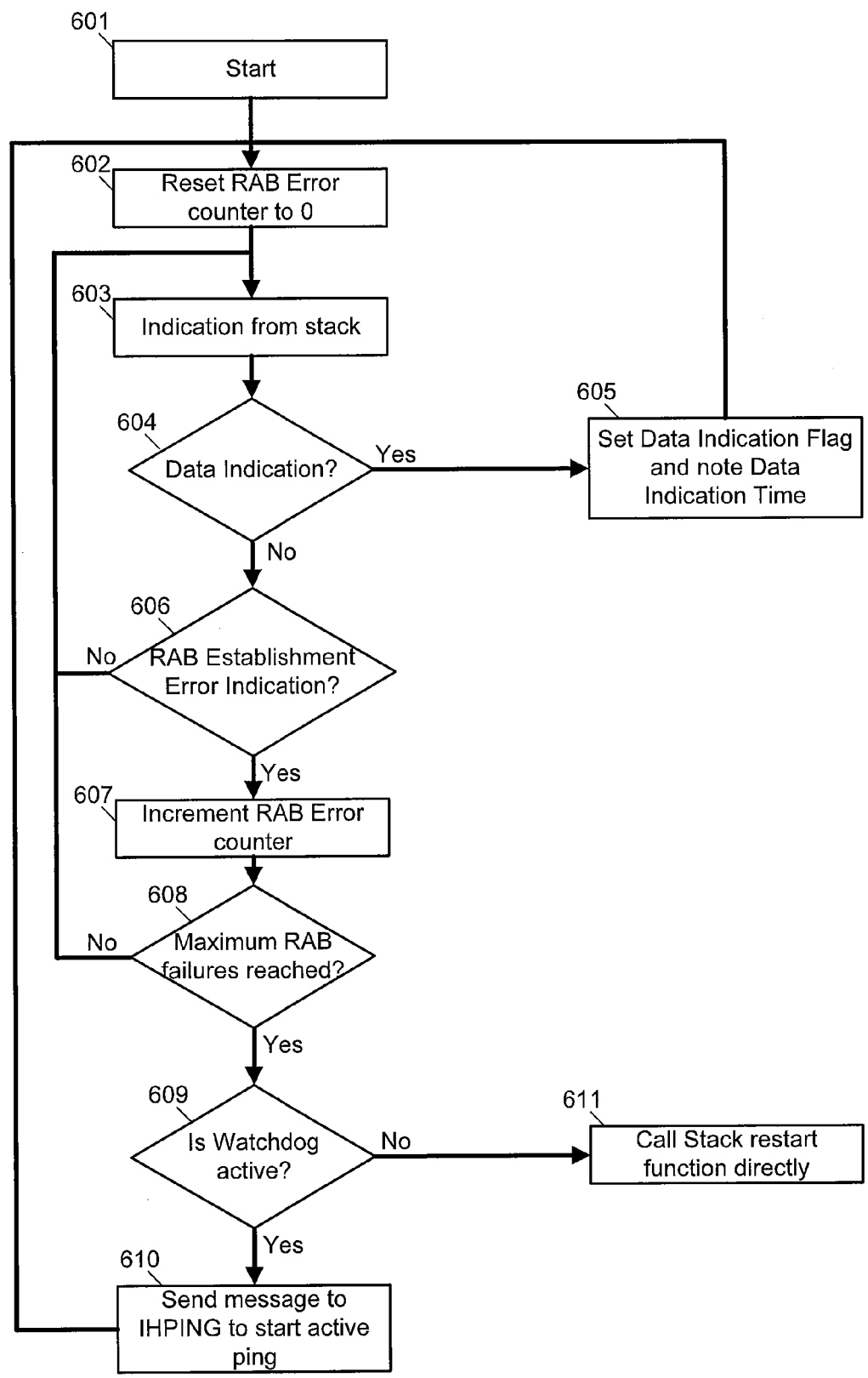
FIG. 6 depicts an exemplary procedure for checking and handling data connectivity errors.

FIG. 6 depicts an exemplary procedure for checking and handling data connectivity errors. In addition to checking for loss of data connectivity through pinging of the ping server 106, the ping mechanism 108 of the satellite terminal 102 may also have the RAB error monitor 109 running concurrently in the RAB error monitoring state 206. In block 601, the RAB error monitor 109 may be started. For example, when the ping mechanism 108 transitions from the startup state 201 to the ping idle state 202, the ping mechanism 108 may concurrently enter the RAB error monitoring state 206, where the RAB error monitor 109 may be started.

In block 602, the RAB error monitor 109 may set a RAB error counter to zero. A RAB error counter may count the number of consecutive RAB errors detected by the RAB error monitor 109 without intervening successful data receipt or transmission. When the RAB error monitor 109 starts, no RAB errors may have been detected yet, so the RAB error counter may be started at zero. The RAB error counter may also be reset to zero when an indication of successful data receipt or transmission occurs, as any future RAB errors would then not be consecutive with the previously counted RAB errors.

In block 603, the RAB error monitor 109 may receive an indication from the communications stack 110. The communications stack 110 may communicate with the RAB error monitor 109 through indications, which may be messages indicating, for example, recent activity by the communications stack 110.

In block 604, the RAB error monitor 109 may determine if the indication is a data indication. If the satellite terminal 102 has recently sent data to or received data from the satellite ground station 101, the communications stack 110 may send a data indication to the RAB error monitor 109. If the indication received by the RAB error monitor 109 is a data indication, flow proceeds to block 605. Otherwise flow proceeds to block 606.

In block 605, the RAB error monitor 109 may set a "Data Indication" flag and note the time of receipt of the data indication. The "Data Indication" flag may indicate that data connectivity exists between the satellite terminal 102 and satellite ground station 101, evidenced by the recent sending or receiving of data. Flow may proceed from block 605 back to block 602, where the RAB error counter may be reset.

In block 606, the RAB error monitor 109 may determine if the indication is a RAB Establishment Error indication. If the satellite terminal 102 has detected errors in data transmission to and from the satellite ground station 101, including, for example, excess dropped packets, corrupted data, and/or lack of data ability to send and/or receive data, the satellite terminal 102 may generate a RAB Establishment Error indication. If the indication is a RAB Establishment Error indication, flow proceeds to block 607. Otherwise, flow proceeds back to block 603, where the RAB error monitor 109 may receive another indication from the communications stack 110.

In block 607, the RAB error monitor 109 may increment the RAB Error counter. If the data indication is a RAB Establishment Error indication, the RAB Error counter may incremented to track the number of consecutive RAB Establishment errors detected by the RAB error monitor 109.

In block 608, the RAB error monitor 109 may determine if the maximum number of RAB failures has been reached. The maximum number of RAB failures may be a configurable number indicating the maximum number of consecutive RAB errors the RAB monitor needs to detect before determining that data connectivity has been lost. The RAB error monitor 109 may compare the RAB error count to the maximum number of RAB errors to determine if the maximum has been reached. If the maximum number of RAB errors has been reached, for example, the maximum number of RAB failures is six, and the RAB error counter is at six, flow proceeds to block 609. Otherwise, flow proceeds back to block 603, where the RAB error monitor 109 may receive another indication from the communications stack 110.

In block 609, the RAB error monitor 109 may determine if a watchdog is still active. If the watchdog is still active, flow proceeds to block 610. Otherwise, flow proceeds to block 611.

In block 610, the RAB error monitor 109 may send a message to the ping mechanism 108 to enter the active ping state 203. The RAB error monitor 109 may, using the watchdog, send the restart message to the ping mechanism 108. The restart message may cause the ping mechanism 108 to transition from the ping idle state 202 to the active ping state 203. Flow then loops back to block 602, where the RAB error counter may be reset and the RAB error monitor 109 may continue monitoring.

In block 611, the RAB error monitor 109 may directly call a function restart the communications stack 110. If the watchdog process is not active, the RAB error monitor 109 may not be able to send the restart message to cause the ping mechanism 108 to enter the active ping state 203. In order to restore data connectivity, the RAB error monitor 109 may restart the communications itself, by directly calling the function that restarts the communication stack.

Figure 7:
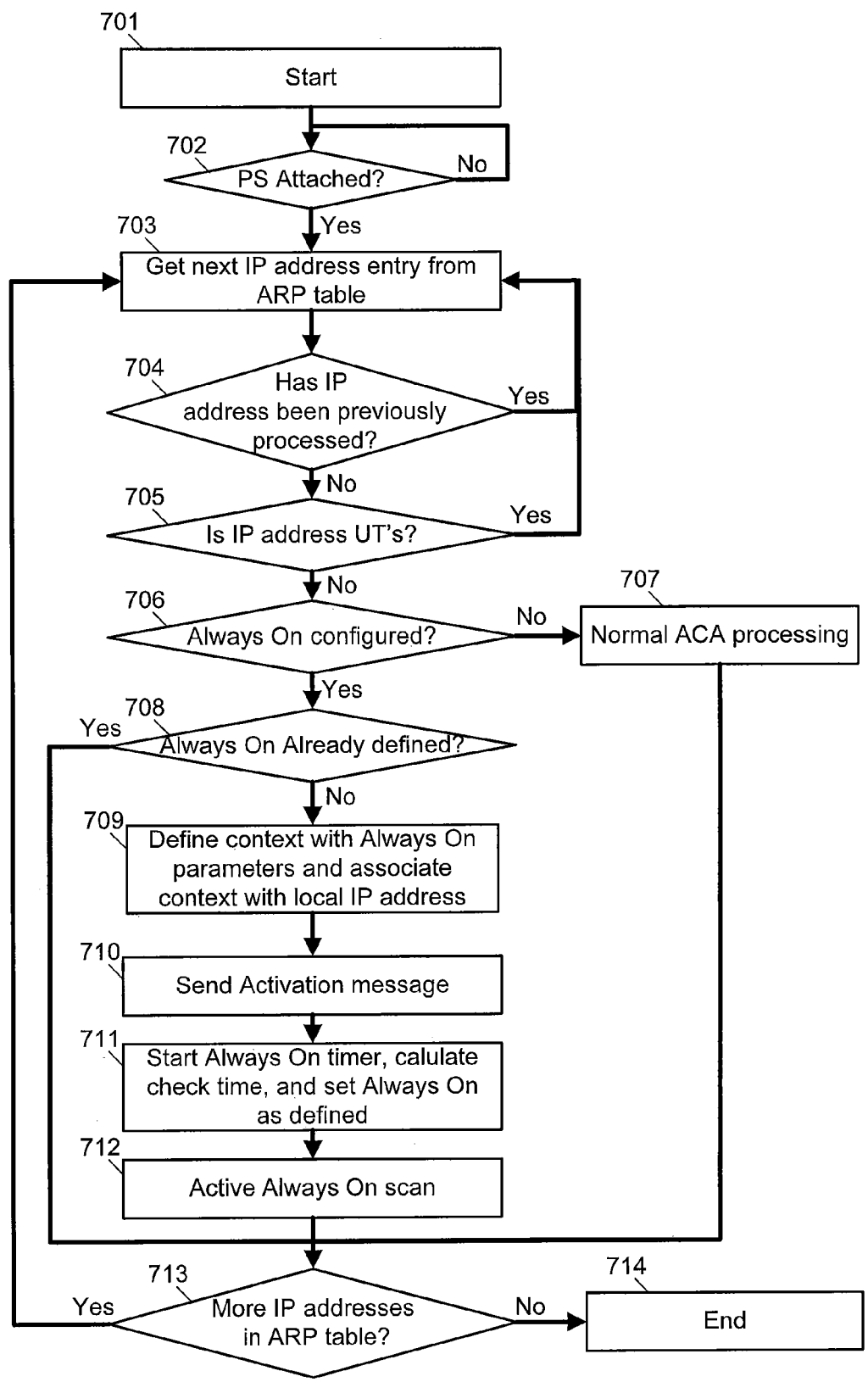

FIG. 7 depicts an exemplary procedure for determining if a connection is always on. In block 701, the satellite terminal 102 may start checking on the connections, or PDP contexts, between the satellite terminal 102 and the satellite ground station 101, to determine if the connections are always-on connections.

In block 702, the satellite terminal 102 may determine if it is Packet Switched (PS) attached. If the satellite terminal 102 is PS attached, flow proceeds to block 703. Otherwise, flow loops back to block 702, until the satellite terminal 102 is PS attached.

In block 703, the satellite terminal 102 may retrieve the next IP address in an Address Resolution Protocol (ARP) table. The ARP table may be a table which lists previously contacted IP addresses and correlated Media Access Control (MAC) addresses.

In block 704, the satellite terminal 102 may determine if the IP address has been previously processed. If the IP address has been previously processed, for example, if the satellite terminal 102 has already checked the IP address to determine if it is part of an always-on connection or PDP context, flow proceeds back to block 703. Otherwise, flow proceeds to block 705.

In block 705, the satellite terminal 102 may determine if the IP address belongs to a User Terminal (UT). If the IP address is a UT's, flow proceeds back to block 703. Otherwise, flow proceeds to block 706.

In block 706, the satellite terminal 102 may determine if "Always On" is configured for the IP address. If "Always On" is not configured for the IP address, flow proceeds to block 707. Otherwise, flow proceeds to block 708.

In block 707, the satellite terminal 102 may apply normal Automatic Context Activation (ACA) processing to the IP address. The IP address may not be part of an always-on connection, and may only require normal ACA processing.

In block 708, the satellite terminal 102 may determine if "Always On" is already defined for the IP address. If "Always On" is already defined, then the IP address may already be part of an always-on connection, and flow proceeds to block 713. Otherwise, flow proceeds to block 709.

In block 709, the satellite terminal 102 may define a PDP context with "Always On" parameters and associate the PDP context with a local IP address. An always-on connection, or PDP context, may be established for the IP address. This always-on connection may then be associated with the local IP address for the satellite terminal 102, establishing an always-on connection between the satellite terminal 102 and the satellite ground station 101.

In block 710, the satellite terminal 102 may send an activation message. The activation message may be sent to the satellite ground station 101 and may indicate the activation of an always-on connection between the satellite terminal 102 and the satellite ground station 101.

In block 711, an "Always On" timer may be started for the always-on connection, a check time may be calculated, and "Always On" may be defined for the IP address. The "Always On" timer may track how long the "Always On" connection is active, and the check time may be the amount of time that must elapse before attempting to reactivate the always-on connection. "Always On" may be defined for the IP address so that satellite terminal 102 can determine that the IP address is part of an always-on connection and doesn't redefine a PDP context for the IP address in the future.

In block 712, the satellite terminal 102 may star an active "Always On" scan for the IP address. The active "Always On" scan may check the always-on connection to ensure the PDP context for the always-on connection is active and attempt to reactivate the PDP context for the always-on connection if the always-on connection is found to be inactive.

In block 713, the satellite terminal 102 may determine if there are more IP addresses in the ARP table. If there are more IP addresses in the ARP table, flow proceeds back to block 703. Otherwise, flow proceeds to block 714 and ends.

Figure 8:
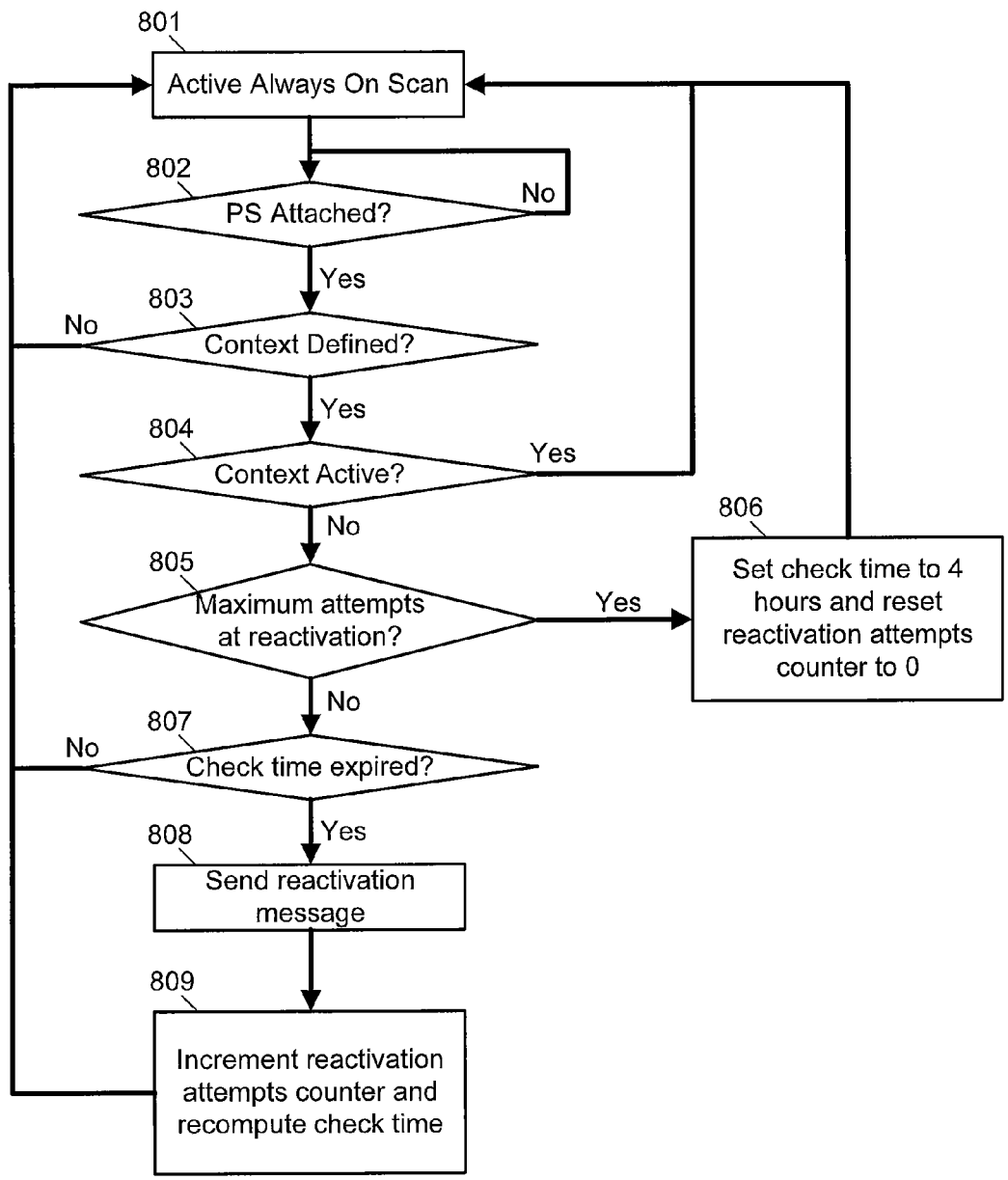
FIG. 8 depicts an exemplary procedure of an active scan for an always on connection.

FIG. 8 depicts an exemplary procedure of an active scan for an always on connection. Once an always-on connection has been started, the satellite terminal 102 may continuously monitor the always-on connection to ensure it remains active. In block 801, the active "Always On" scan may be started for a PDP context.

In block 802 the satellite terminal 102 may determine if it is PS attached to the network. If it is PS attached, flow proceeds to block 803. Otherwise, flow loops back to block 802 until it is PS attached.

In block 803, the satellite terminal 102 may determine if the PDP context is defined. If the PDP context for the always-on connection is defined, flow proceeds to block 804. Otherwise flow loops back to block 801.

In block 804, the satellite terminal 102 may determine if the PDP context is active. If the PDP context is active, for example, the always-on connection is active and can be used to transmit and receive data, flow loops back to block 801, as the always-on connection, or PDP context, is functioning and does not need to be reactivated. Otherwise, if the PDP context is not active, flow proceeds to block 805.

In block 805, the satellite terminal 102 may determine if the maximum number of attempts at reactivating the PDP context have already been made. The PDP context may have a reactivation attempts counter, which may track the number of time the satellite terminal 102 has attempted to reactive the PDP context. There may be a maximum number of attempts at reactivation that can be made for any given PDP context before the satellite terminal 102 takes alternative action rather than attempting another reactivation. The maximum number of reactivation attempts may be any suitable number and may be configurable. If the satellite terminal 102 has already made the maximum number of reactivation attempts, flow proceeds to block 806. Otherwise flow proceeds to block 807.

In block 806, the check time may set to, for example, 4 hours, and the reactivation attempts count may be set to zero. Once the maximum number of reactivation attempts have been made, the satellite terminal 102 may set the check time to a longer time period, such as, for example, 4 hours, to prevent any more reactivation attempts during that time period. This may prevent the satellite terminal 102 from wasting resources constantly attempting to reactivate a PDP context that keeps failing, and from the using an unreliable PDP context for data connectivity. Flow then proceeds back to block 801.

In block 807, the satellite terminal 102 may determine if the check time has expired. If the check time for PDP context has not expired, for example, if the check time was set to 4 hours, and only 3 hours have elapsed, flow proceeds back to block 801. Otherwise, if the check time has expired, flow proceeds to block 808.

In block 808, the satellite terminal 102 may send a reactivation message to the PDP context. The reactivation message may cause the inactive PDP context to be activated thereby restoring the always-on connection.

In block 809, the reactivation attempts counter may be incremented, and the check time may be recomputed. The reactivation attempts counter may be incremented every time a reactivation message is sent to reactivate the PDP context thereby tracking the number of times the PDP context has failed and been reactivated. The check time may be recomputed, which may send the amount of time that must pass before another reactivation attempt can be made for the PDP context. The check time may, for example, increase linearly or exponentially with an increase in the reactivation attempts counter. This may result in greater and greater amounts of time being required to elapse between reactivation attempts for the PDP context thereby preventing the satellite terminal 102 from wasting resources on frequent and closely spaced together reactivation attempts. Flow may proceed from block

809 back to block 801, where the active "Always On" scan may continue monitoring the PDP context.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions have been simplified to illustrate elements that are relevant for a clear understanding of the disclosed systems and methods, while eliminating, for purposes of clarity, other elements. Those of ordinary skill in the art will recognize, however, that these and other elements may be desirable. However, because such elements are well known in the art, and because they do not facilitate a better understanding of the disclosed systems and methods, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the disclosed system, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system for maintaining data connectivity in a satellite communications system comprising:
    a satellite terminal comprising a ping mechanism;
    a satellite ground station; and
    a ping server;
    wherein the ping mechanism is configured to send a ping message to the ping server and, if the message was returned by the ping server, reset a timer, and if the message was not returned by the ping server, restore data connectivity between the satellite terminal and the satellite ground station,
    wherein the ping mechanism is configured to restart a communications stack of the satellite terminal without rebooting the satellite terminal when the ping message sent to the ping server is not returned by the ping server.

2. The system of claim 1, wherein the ping server is configured to return the ping message from the satellite terminal upon receiving the ping message.

3. The system of claim 1, wherein the satellite terminal comprises an error monitor.

4. The system of claim 3, wherein the ping mechanism is configured to restart the communications stack of the satellite terminal when the error monitor detects a configured number of consecutive data errors.

5. The system of claim 4, wherein the ping mechanism is configured to reboot the satellite terminal when the communications stack fails to restart.

6. The system of claim 1, wherein the ping server is co-located with a data server.

7. The system of claim 1, wherein the ping mechanism is configured to ping the ping server when the timer expires.

8. The system of claim 3, wherein the ping mechanism is configured to ping the ping server when the ping mechanism receives a restart message from the error monitor.

9. The system of claim 7, wherein the ping mechanism is configured to ping the ping server when the timer expires and when a ping required is set.

10. The system of claim 9, wherein the timer is set to count down from a time greater than a typical interval between data transmissions between the satellite ground station and the satellite terminal.

11. A method for maintaining data connectivity in a satellite communications system comprising:
    starting a timer;
    sending a ping message to a ping server on expiration of the timer;

determining if the ping message was returned by the ping server; and if the message was returned by the ping server, resetting the timer, and if the message was not returned by the ping server, restarting a communications stack of the satellite terminal without rebooting the satellite terminal.

12. The method of claim 11, further comprising sending a message to a ping server on expiration of the timer only if there has been no successful sending of data to or receiving of data from a satellite ground station within a configured amount of time.

13. The method of claim 11, further comprising:
receiving a restart message from an error monitor.

14. The method of claim 11, further comprising:
determining if the communications stack was previously restarted; and if the communications stack was previously restarted, rebooting a satellite terminal, and if the communications stack was not previously restarted, restarting the communications stack.

15. The method of claim 11, further comprising, when a PDP context is not active and was not active and has not failed more than configured number of times, transitioning to an idle state to allow time for the PDP context to be restarted.

16. The method of claim 15, wherein the PDP context is restarted by an active always-on scan.

17. The method of claim 11, wherein the timer is set to count down from an interval greater than typical interval between data transmission to and from a satellite ground station.

* * * * *